Patented Dec. 23, 1947

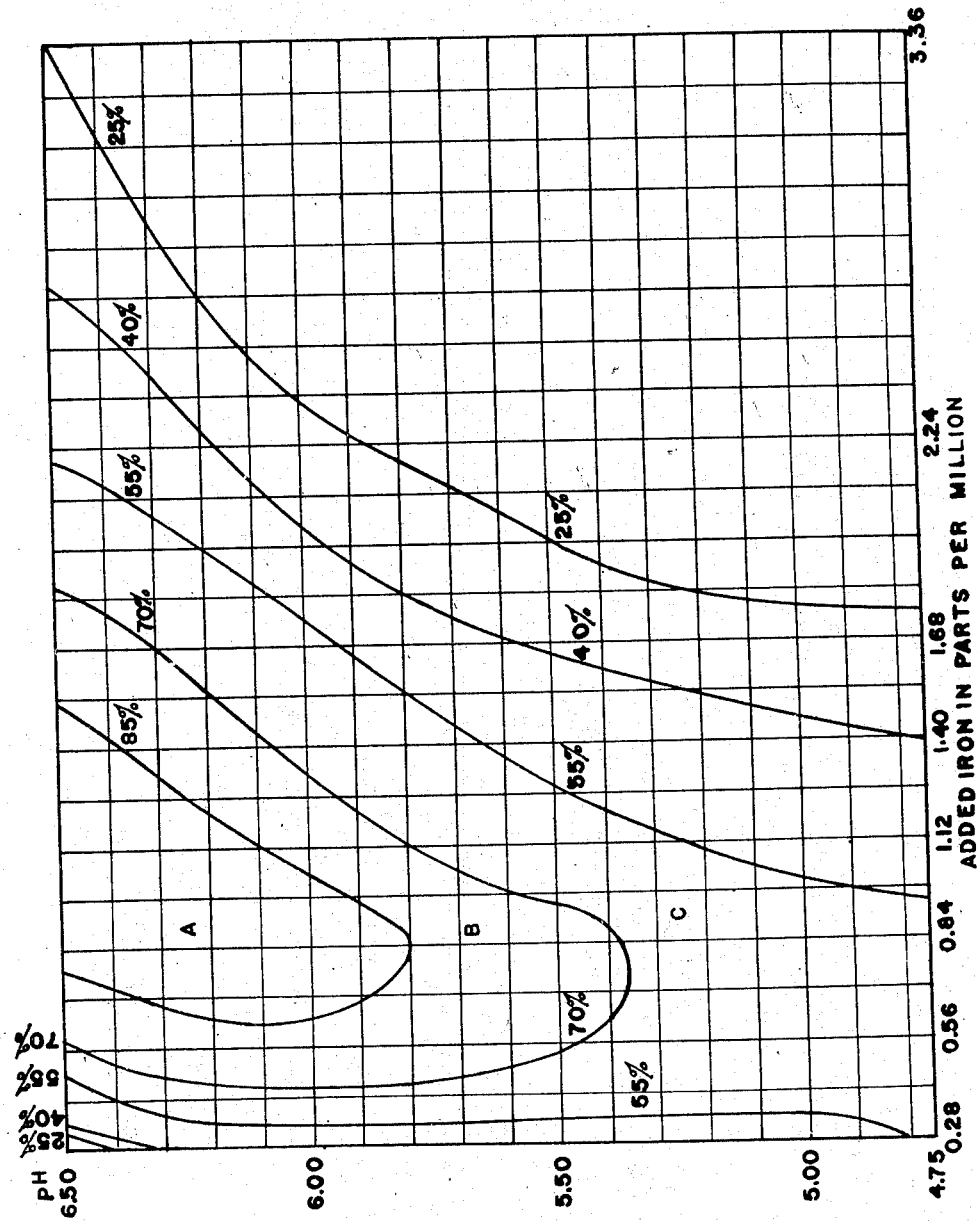

2,433,064

UNITED STATES PATENT OFFICE 2,433,064

METHOD OF PREPARING RIBOFLAVIN FROM WHEY AND SKIM MILK

Nelson E. Rodgers, Henry L. Pollard, and Reginald E. Meade, Appleton, Wis., assignors to Western Condensing Company, San Francisco, Calif., a corporation of California Application December 9, 1944, Serial No. 567,456

4 Claims. (Cl. 195—42)

This invention relates to processes for the manufacture of biologically active materials such as vitamins by fermentation process. More particularly, the invention pertains to the synthesis, from lactose-containing lacteal products (in particular, whey), of riboflavin and other vitamins by the action of bacteria. and, specifically, by the action of the bacterium *Clostridium acetobutylicum*.

The present application is a continuation-in-part of the application Serial No. 439,310, filed April 17, 1942, by Henry L. Pollard, Nelson E. Rodgers and Reginald E. Meade entitled "Process for manufacturing a vitamin concentrate" (now issued as United States Patent No. 2,369,680).

The following paragraphs describe generally a fermentation process to the improvement of which the present invention is particularly directed.

As disclosed in our copending application, we have found that the natural riboflavin content of whey or skim milk may be increased to a considerable extent by subjecting whey or skim milk, under controlled conditions, to the fermenting action of *Clostridium acetobutylicum*. Such a fermentation synthesis of riboflavin is accompanied by the formation of neutral solvents such as ethanol, acetone, and butanol, and gases such as hydrogen and carbon dioxide, which can be recovered as valuable by-products.

To prepare a lactose-containing lacteal medium, such as whey or skim milk, for fermentation to increase its riboflavin content, it is sterilized completely or substantially completely as by heat treatment at about 250° F. for about ten to twenty minutes. In addition, the acidity of the lacteal medium is neutralized preferably to a pH of 6 to 7 by adding an alkaline reagent such as sodium, potassium or calcium hydroxide. Calcium carbonate may be added to enhance riboflavin production. The iron content of the lacteal medium is adjusted to the range of from 0.5 to less than 4.5 parts per million. In this connection it should be noted that the natural iron content of uncontaminated whey or skim milk will range from 0.10 to 0.21 part per million, while the iron content of whey contaminated, as by corrosive contact with iron containers, may reach a value above 4.5 parts per million. In the case of uncontaminated whey, the iron content may be increased by incorporation of suitable amounts of a soluble ferrous salt such as ferrous sulfate, while whey containing too much iron may be diluted with uncontaminated whey.

The thus prepared material, cooled to a temperature of about 100° F., is placed in a fermenting container and inoculated with *Clostridium acetobutylicum* (such as described by McCoy, Peterson and Hastings in "Journal of Infectious Diseases," volume 39, page 457), preferably at a temperature about 100° F. under conditions such as will prevent the introduction of iron and contaminating organisms. A suitable inoculum may be prepared from a stock culture by repeated transfers to a nutrient medium such as whey.

In general fermentation of a batch of whey can continue for from twelve to forty-eight hours, or until there is no noticeable further increase in the riboflavin content.

The gases formed during fermentation can be vented from the fermenting tank as formed. The solvents formed during fermentation can be removed by fractional distillation, and after removing volatile products the fermented material can be concentrated by evaporation to produce a concentrated liquor. This liquor can be further subjected to drying to produce a powdered product.

If desired, instead of separately fractionating the solvents, they can be condensed from the vapors evolved during concentration of the fermented material by evaporation to form a water-solvent mixture from which the solvents can be removed by fractional distillation.

At some point after fermentation, it is desirable to inhibit further bacterial action, as for example by heat sterilization applied as a separate step or in conjunction with concentration by evaporation.

The product obtained by the above procedure is a concentrate which can be further refined or blended with various food material for human or animal consumption. By use of the process described hereinabove, the riboflavin content of whey has been increased from about 1.4 to from 6 to 70 micrograms per milliliter (before concentration), which corresponds to about 240 to 2800 micrograms per gram on a dried basis.

Some of the lactose is consumed in the fermenting process so that the final product contains a reduced amount of milk sugar, depending upon the extent of fermentation. The solids of the final product are the remaining solids of the whey or skim milk employed and therefore are available as food ingredients which are used to advantage when the product is blended with other material, such as various milk products, bread and bakery products, poultry and animal feeds and the like.

An important feature of the invention described and claimed in our hereinbefore referred to copending application relates to our discovery that, for good riboflavin yields, it is critically important to regulate the iron content of the whey or skim milk between the limits of 0.5 to less than 4.5 parts per million. If the iron content falls below the lower limit of 0.5 part per million, relatively little riboflavin is synthesized and the yield of neutral solvents is reduced.

For good yields of riboflavin, the iron content should be kept below 4.5 parts per million. If the iron content exceeds 4.5 parts per million, relatively little riboflavin is synthesized, although good yields of neutral solvents may still be obtained.

We have now found that consistently good yields of riboflavin from lactose-containing lacteal liquids are obtained by regulating not only the iron content but by also regulating the pH level as influenced by lactic acid content.

Further, we have discovered that a definite correlation exists between the optimal iron concentration and the optimal pH levels due to lactic acid so that, for consistently good yields of riboflavin, these two factors should not only fall between certain limits but should also be correlated.

We have found that the yields of riboflavin from lactic acid contaminated whey are increased if alkali is added in amounts sufficient to raise the pH of the whey to at least 6.4.

It is therefore an important object of the present invention to provide a method for synthesizing biologically active materials, such as riboflavin, from lactose-containing lacteal liquids by fermentation in which the material is held within definite correlated limits of iron content and pH level due to lactic acid.

Another important object of the present invention is to provide a method for enhancing the yield of riboflavin in the fermentation of whey or skim milk containing lactic acid in amounts normally tending to inhibit such synthesis.

Other and further objects and features of the present invention will become apparent from the following description and appended claims.

In proceeding according to the present invention the directions given hereinabove as applying to the methods of the copending application are followed except for the variations disclosed hereinbelow.

obtained. Curves of 25% yields, 40% yields, 55% yields, 70% yields, and 85% yields are illustrated. The curves of the three highest yield levels enclose areas designated as A, B and C respectively.

For best yields the added iron content of the whey and pH of the whey due to lactic acid should be regulated to combinations which fall within the area A enclosed by the 85% yield curve. Riboflavin yields of 85% or better should then be obtained.

Satisfactory yields also can be obtained by regulating the added iron content and pH combinations to fall within the area B between the 70% and 85% yield curves or the area C between the 55% and 70% yield curves.

The type of results obtained when proceeding according to the present invention are illustrated in the following experiment tabulated Example 1, in which the influence on riboflavin synthesis of iron concentration and varied pH levels due to lactic acid have been tested.

The basal medium used in this experiment was rennet whey supplemented with 4.8 parts per million zinc sulfate heptahydrate, 4.2 parts per million of manganous sulfate monohydrate, 10 parts per billion of para-amino benzoic acid, 0.15% calcium carbonate and 0.15% tricalcium phosphate. Portions of the basal medium were adjusted to various pH levels with lactic acid and supplemented with various concentrations of iron (as ferrous sulfate) as indicated in the accompanying table. The various media were then autoclaved, inoculated with 4% of a suitable *Clostridium acetobutylicum* starter and incubated at 100° F. for 48 hours. The riboflavin yields in duplicate cultures are shown in the following table:

*Example I*

| pH before Sterilization | pH after Sterilization | Per cent lactic acid added | Flavin μg/ml., Added Iron in Parts Per Million | | | | | | | |
|---|---|---|---|---|---|---|---|---|---|---|
| | | | 0.28 | 0.56 | 0.84 | 1.12 | 1.40 | 1.68 | 2.24 | 3.36 |
| 6.57 | 6.30 | 0 | 7 | 27 | 48 | 58 | 56 | 47 | 33 | 16 |
| | | | 6 | 29 | 48 | 62 | 59 | 46 | 36 | 15 |
| 6.30 | 6.12 | .043 | 18 | 46 | 56 | 58 | 49 | 39 | 27 | 4 |
| | | | 22 | 42 | 60 | 60 | 47 | 39 | 21 | 5 |
| 6.20 | 6.06 | .055 | 24 | 44 | 57 | 60 | 46 | 38 | 18 | 5 |
| | | | 28 | 44 | 56 | 60 | 46 | 39 | 21 | 5 |
| 6.10 | 6.00 | .068 | 33 | 57 | 58 | 56 | 45 | 36 | 18 | 5 |
| | | | 26 | 38 | 60 | 52 | 46 | 30 | 22 | 5 |
| 6.00 | 6.00 | .077 | 30 | 48 | 59 | 46 | 43 | 34 | 15 | 5 |
| | | | 13 | 42 | 50 | 50 | 43 | 35 | 16 | 5 |
| 5.75 | 5.90 | .107 | 32 | 43 | 44 | 39 | 36 | 29 | 10 | 5 |
| | | | 33 | 41 | 46 | 39 | 36 | 29 | 10 | 5 |
| 5.50 | 5.75 | .137 | 32 | 41 | 41 | 35 | 28 | 19 | 9 | 5 |
| | | | 34 | 42 | 43 | 35 | 28 | 18 | 9 | 5 |
| 5.25 | 5.69 | .175 | 29 | 35 | 34 | 22 | 13 | 8 | 5 | 5 |
| | | | 37 | 38 | 28 | 25 | 16 | 13 | 5 | 5 |
| 5.00 | 5.58 | .202 | 29 | 35 | 29 | 22 | 10 | 13 | 5 | 5 |
| | | | 31 | 34 | 27 | 21 | 16 | 8 | 5 | 5 |

In adjusting the pH due to lactic acid content and the iron content of the whey or other medium, both variables are correlated to fall within one of the enclosed areas on the accompanying diagram.

This diagram is based on the results of several experiments. On the diagram, added iron contents of whey and pH levels of the whey due to lactic acid are plotted in relation to percentages of maximum yields of riboflavin in a projection of a triaxial plot. Thus, the iron contents, in parts per million above the normal iron content of uncontaminated whey, are plotted as abscissa, while the pH levels are plotted as ordinates. The curves are designated in terms of percentages of maximum yields and define limits of iron concentration and pH level combinations at which the specified percentages of maximum yields are The tabulated data of Example I shows that lactic acid has an inhibiting influence on riboflavin synthesis. The development of lactic acid prior to synthesis should therefore be avoided. However, we have found that if a high lactic acid whey or skim milk is to be used, the inhibitory influence of lactic acid on riboflavin synthesis can be lessened by adding a sufficient amount of an alkali, such as lime or calcium hydroxide, to raise the pH level to 6.0 and up to 6.6. pH levels as high as 6.8 to 7.0 are also operative but do not result in quite as good yields as the range of pH 6.0 to 6.6.

The addition of lime or other alkali is made preferably before the whey or other lacteal medium is sterilized.

It should be noted that results such as those tabulated in Example I are obtained when the pH is controlled by additions of lactic acid. Divergent results may be obtained if mineral acids such as hydrochloric acid are used to control the pH level, as described in our copending application, Serial No. 563,081, filed November 11, 1944.

The following tabulated Example II illustrates the results obtained in an experiment wherein various alkalies were added to whey containing excessive amounts of lactic acid.

The basal medium used in this experiment (Example II) was rennet whey of pH 6.58 and containing 0.075% titratable acid as lactic acid. This whey was adjusted to pH 6.3 with 5 normal hydrochloric acid. A portion of the adjusted whey was reserved for use as a control and 0.12% lactic acid was added to the remainder. The lactic acid was added as a 20% solution, in which the anhydride and the lactide had been hydrolyzed by autoclaving for 10 minutes at 250° F. The whey was then segregated into samples of 100 milliliters. Iron (as ferrous sulfate) was added to these samples in the amounts tabulated hereinbelow. Various samples of the whey were adjusted to the pH levels indicated in the table with two normal solutions or slurries of sodium hydroxide, sodium carbonate and calcium hydroxide. One series was left unadjusted. The whey samples were then supplemented with 0.15% of calcium carbonate, 0.15% of tricalcium phosphate, 4.8 parts per million of zinc sulfate heptahydrate, 4.2 parts per million of manganous sulfate monohydrate, and 10 parts per billion of para-amino benzoic acid. The variously supplemented media were then autoclaved, inoculated with 4% of a suitable *Clostridium acetobutylicum* starter and incubated at 100° F. for 48 hours. The riboflavin yields in duplicate cultures are shown in the following table:

When fermenting whey containing excessive amounts of lactic acid partially neutralized with lime, very little if any iron need be added to that naturally present in uncontaminated whey. Preferably about 0.2 to 1 part per million are added.

In the foregoing, particular reference has been made to the synthesis of riboflavin. It is to be understood, however, that other nutritive or vitamin factors or factors of B complex may be synthesized in addition to riboflavin.

Many details of composition and procedure may be varied within a wide range without departing from the principles of this invention and it is therefore not our purpose to limit the scope of the patent granted on this invention otherwise than necessitated by the scope of the appended claims.

We claim as our invention:

1. In a process of manufacturing a vitamin concentrate including the steps of synthesizing riboflavin by first sterilizing and then fermenting with *Clostridium acetobutylicum* a lactose-containing lacteal medium selected from the group consisting of whey and skim milk, said medium containing lactic acid in an amount effecting in said material a pH ranging from 5.8 to 6.5, the improvement comprising before said sterilization incorporating with said material a salt of iron in an amount such as to cause the iron content in excess of the 0.10 to 0.21 parts per million natural iron content of said material and the pH of said material to fall within the enclosed area A in the accompanying diagram.

2. In a process of manufacturing a vitamin concentrate comprising the steps of synthesizing riboflavin by first sterilizing and then fermenting with *Clostridium acetobutylicum* a lactose-

*Example II*

| Alkali | ml./L 5N Alkali | pH Before Sterilization | pH After Sterilization | Riboflavin µg./ml., Added Fe in Parts Per Million | | | | | | |
|---|---|---|---|---|---|---|---|---|---|---|
| | | | | 0.28 | 0.56 | 0.84 | 1.12 | 1.40 | 1.68 | 2.24 |
| Control—without lactic acid | | 6.30 | 6.22 | 10<br>13 | 48<br>54 | 54<br>56 | 45<br>45 | 40<br>42 | 36<br>37 | 20<br>18 |
| 0.12% lactic acid | | | | | | | | | | |
| No Base Added | | 4.75 | 5.58 | 30<br>28 | 33<br>33 | 36<br>34 | 25<br>25 | 20<br>23 | 12<br>14 | 5<br>5 |
| Added NaOH | 6.0 | 6.80 | 6.61 | 16<br>12 | 39<br>39 | 36<br>39 | 34<br>32 | 29<br>30 | 23<br>26 | 13<br>14 |
| | 5.6 | 6.60 | 6.50 | 11<br>11 | 43<br>43 | 37<br>38 | 30<br>31 | 27<br>31 | 23<br>26 | 16<br>10 |
| | 5.2 | 6.40 | 6.22 | 47<br>41 | 48<br>46 | 38<br>42 | 28<br>31 | 29<br>31 | 23<br>19 | 10<br>8 |
| Added Na₂CO₃ | 15.1 | 6.79 | 7.30 | 6<br>5 | 16<br>24 | 33<br>34 | 34<br>31 | 30<br>30 | 20<br>20 | 9<br>7 |
| | 13.6 | 6.60 | 7.30 | 6<br>6 | 34<br>30 | 33<br>28 | 31<br>34 | 32<br>33 | 26<br>27 | 11<br>9 |
| | 11.3 | 6.40 | 7.00 | 6<br>7 | 39<br>42 | 38<br>39 | 37<br>35 | 32<br>32 | 28<br>27 | 17<br>16 |
| Added Ca(OH)₂ | 13.1 | 6.79 | 6.40 | 39<br>40 | 40<br>39 | 34<br>37 | 28<br>22 | 30<br>21 | 16<br>15 | 7<br>8 |
| | 10.0 | 6.59 | 6.00 | 45<br>42 | 49<br>51 | 44<br>47 | 39<br>34 | 31<br>32 | 20<br>24 | 15<br>8 |
| | 8.8 | 6.40 | 5.80 | 39<br>42 | 49<br>48 | 46<br>45 | 39<br>38 | 34<br>30 | 23<br>22 | 20<br>7 |

In the table, the first two horizontal columns show clearly a lowering of yield due to the addition of 0.12% lactic acid. The table also shows that improved yields at some point within the entire iron range are obtained when an alkali is added to raise the pH value. This is particularly apparent at an iron concentration of 0.56 part per million.

It should be observed that the optimum pH values vary somewhat with the type of alkali used.

containing lacteal material selected from the group consisting of whey and skim milk, said material containing lactic acid in an amount effecting the pH falling within the range of from 4.75 to 6.5, the improvement comprising before said sterilization incorporating with said material a salt of iron in such an amount as to cause the iron content in excess of the 0.10 to 0.21 part per million natural iron content of said material and the pH of said material to fall somewhere within the enclosed areas A, B and C on the accompanying diagram.

3. In a process for manufacturing a vitamin concentrate comprising the steps of synthesizing riboflavin by first sterilizing and then fermenting whey with *Clostridium acetobutylicum*, said whey containing lactic acid in an amount effecting a pH of between 5.8 and 6.5, the improvement comprising before said sterilization incorporating with said whey a salt of iron in such amounts as to cause the iron content in excess of the 0.10 to 0.21 part per million natural content of said whey and the pH of said material to fall within the enclosed area A on the accompanying diagram.

4. In a process for manufacturing a vitamin concentrate comprising the steps of synthesizing riboflavin by first sterilizing and then fermenting whey with *Clostridium acetobutylicum*, said whey containing lactic acid in an amount effecting a pH of between 4.75 and 6.50 in said whey, the improvement comprising before said sterilization incorporating with said whey a salt of iron in such amount as to cause the iron content in excess of the 0.10 to 0.21 parts per million natural iron content of said whey and the pH of said whey to fall somewhere within the enclosed areas A, B and C on the accompanying diagram.

NELSON E. RODGERS.
HENRY L. POLLARD.
REGINALD E. MEADE.

REFERENCES CITED

The following references are of record in the file of this patent:

UNITED STATES PATENTS

| Number | Name | Date |
| --- | --- | --- |
| 2,387,023 | Hines | Oct. 16, 1945 |
| 2,128,845 | Myers et al. | Aug. 30, 1938 |
| 2,202,161 | Miner | May 28, 1940 |
| 2,297,671 | Yamasaki | Sept. 29, 1942 |
| 2,369,680 | Meade et al. | Feb. 20, 1945 |
| 2,326,425 | Arzberger | Aug. 10, 1943 |
| 2,139,108 | Arzberger | Dec. 6, 1938 |
| 2,089,522 | Woodruff et al. | Aug. 10, 1937 |